United States Patent
Komemushi

(10) Patent No.: US 11,731,723 B2
(45) Date of Patent: Aug. 22, 2023

(54) RIDER RECOGNITION DEVICE FOR HUMAN-POWERED VEHICLE AND CONTROL SYSTEM OF HUMAN-POWERED VEHICLE

(71) Applicant: SHIMANO Inc., Sakai (JP)

(72) Inventor: Takashi Komemushi, Sakai (JP)

(73) Assignee: Shimano Inc., Sakai (JP)

( * ) Notice: Subject to any disclaimer, the term of this patent is extended or adjusted under 35 U.S.C. 154(b) by 880 days.

(21) Appl. No.: 16/503,584

(22) Filed: Jul. 4, 2019

(65) Prior Publication Data

US 2020/0010137 A1 Jan. 9, 2020

(30) Foreign Application Priority Data

Jul. 9, 2018 (JP) .................. 2018-130244
Jul. 9, 2018 (JP) .................. 2018-130245
Jul. 9, 2018 (JP) .................. 2018-130246
Dec. 18, 2018 (JP) .................. 2018-236761

(51) Int. Cl.
*B62J 45/41* (2020.01)
*G05B 13/02* (2006.01)
*B62M 6/80* (2010.01)
*B62J 1/08* (2006.01)
*B62M 25/08* (2006.01)
(Continued)

(52) U.S. Cl.
CPC .................. *B62J 45/41* (2020.02); *B62J 1/08* (2013.01); *B62K 25/04* (2013.01); *B62M 6/80* (2013.01); *B62M 25/08* (2013.01); *G05B 13/0265* (2013.01); *B62J 43/20* (2020.02);
(Continued)

(58) Field of Classification Search
CPC ... B62J 45/20; B62J 45/40; B62J 45/41; B62J 1/08; B62J 43/20; B62J 50/20; B62J 50/22; B62J 2001/085; B62K 25/04; B62K 2025/044; B62M 6/40; B62M 6/45; B62M 6/50; B62M 6/55; B62M 6/80; B62M 25/08; G05B 13/0265; B60L 50/20; G01D 1/0088
See application file for complete search history.

(56) References Cited

U.S. PATENT DOCUMENTS 5,274,801 A  12/1993 Gordon et al.
6,047,230 A  4/2000 Spencer et al.
(Continued)

FOREIGN PATENT DOCUMENTS

CN  108313188 A  7/2018
DE  102014007265 A1  11/2014
(Continued)

*Primary Examiner* — Orlando Bousono
(74) *Attorney, Agent, or Firm* — Alleman Hall Creasman & Tuttle LLP

(57) ABSTRACT

To provide a rider recognition device for a human-powered vehicle and a control system of a human-powered vehicle that improve the usability, a rider recognition device for a human-powered vehicle includes a detector and an artificial intelligence processing unit. The detector detects state information while the human-powered vehicle is traveling. The state information is related to at least one of a state of the human-powered vehicle and a state of a rider of the human-powered vehicle. The artificial intelligence processing unit recognizes the rider corresponding to the state information detected by the detector.

15 Claims, 8 Drawing Sheets

(51) Int. Cl.
  *B62K 25/04*   (2006.01)
  *B62J 50/22*   (2020.01)
  *B62J 43/20*   (2020.01)

(52) U.S. Cl.
  CPC .......... *B62J 50/22* (2020.02); *B62J 2001/085* (2013.01); *B62K 2025/044* (2013.01)

(56) References Cited

U.S. PATENT DOCUMENTS

| | | | |
|---|---|---|---|
| 6,682,087 | B1 | 1/2004 | Takeda |
| 6,877,755 | B2 | 4/2005 | Takamoto |
| 6,917,283 | B2 | 7/2005 | Takeda |
| 7,399,244 | B2 | 7/2008 | Takebayashi et al. |
| 7,522,033 | B2 | 4/2009 | Takamoto et al. |
| 7,760,078 | B2 | 7/2010 | Miki et al. |
| 7,902,967 | B2 | 3/2011 | Takebayashi |
| 8,655,561 | B2 | 2/2014 | Kitamura |
| 9,399,500 | B1 | 7/2016 | Hashimoto et al. |
| 9,975,603 | B2 | 5/2018 | Bortolozzo et al. |
| 10,696,351 | B2 | 6/2020 | Suzuki et al. |
| 2008/0114519 | A1 | 5/2008 | DuFaux et al. |
| 2008/0276493 | A1 | 11/2008 | Dunias |
| 2015/0197308 | A1 | 7/2015 | Butora et al. |
| 2016/0001782 | A1 | 1/2016 | Fiedler |
| 2016/0075177 | A1 | 3/2016 | Biderman et al. |
| 2016/0144928 | A1* | 5/2016 | Chun .................. B62M 6/45 701/22 |
| 2017/0259879 | A1 | 9/2017 | Southey et al. |
| 2017/0282919 | A1 | 10/2017 | Schieffelin |
| 2018/0009508 | A1 | 1/2018 | Suzuki et al. |
| 2018/0072373 | A1* | 3/2018 | Kishita .................. B62M 6/40 |
| 2018/0197401 | A1* | 7/2018 | Khaligh .................. B62M 6/50 |
| 2018/0232982 | A1* | 8/2018 | Hsu .................. B62J 45/422 |
| 2019/0126913 | A1* | 5/2019 | Kinuhata .................. B60W 30/02 |
| 2019/0202512 | A1* | 7/2019 | Shen .................. B60N 2/16 |
| 2019/0315431 | A1* | 10/2019 | Vijaya Kumar .......... B62M 6/45 |
| 2020/0014321 | A1 | 1/2020 | Kondo |
| 2020/0014322 | A1 | 1/2020 | Kondo |
| 2020/0130771 | A1* | 4/2020 | Jacobsz Rosier ........ B62J 45/20 |
| 2020/0247498 | A1 | 8/2020 | Yamamoto et al. |
| 2020/0410375 | A1* | 12/2020 | Seagraves ................ G01S 19/01 |
| 2021/0031848 | A1* | 2/2021 | Du .................. B60R 25/32 |
| 2021/0147024 | A1* | 5/2021 | Carlier .................. B62J 45/41 |
| 2021/0323622 | A1* | 10/2021 | Shen .................. B62J 45/414 |
| 2022/0016984 | A1 | 1/2022 | Huang et al. |

FOREIGN PATENT DOCUMENTS

| | | |
|---|---|---|
| JP | 2002234479 A | 8/2002 |
| JP | 2008504857 A | 2/2008 |
| JP | 2012144061 A | 8/2012 |
| JP | 2012148580 A | 8/2012 |
| JP | 5960566 B2 | 8/2016 |
| JP | 2017522634 A | 8/2017 |
| WO | 2005058160 A1 | 6/2005 |
| WO | 2014029759 A1 | 2/2014 |
| WO | 2017093293 A1 | 6/2017 |
| WO | 2018059801 A1 | 4/2018 |

* cited by examiner

RIDER RECOGNITION DEVICE FOR HUMAN-POWERED VEHICLE AND CONTROL SYSTEM OF HUMAN-POWERED VEHICLE

BACKGROUND

The present disclosure relates to a rider recognition device for a human-powered vehicle and a control system of a human-powered vehicle.

For example, patent document 1 describes a human-powered vehicle that changes the setting of the human-powered vehicle in accordance with a rider.

Patent Document 1: Japanese Laid-Open Patent Publication No. 2012-148580

SUMMARY

The human-powered vehicle described in patent document 1 recognizes the rider in accordance with information from a transmitter carried by the rider. Thus, the rider needs to carry the transmitter, and there is room for improvement in the usability.

One object of the present disclosure is to provide a rider recognition device for a human-powered vehicle and a control system of a human-powered vehicle that improve the usability.

A rider recognition device for a human-powered vehicle according to a first aspect comprises a detector and an artificial intelligence processing unit. The detector is configured to detect state information while the human-powered vehicle is traveling. The state information is related to at least one of a state of the human-powered vehicle and a state of a rider of the human-powered vehicle. The artificial intelligence processing unit includes an arithmetic processing device. The artificial intelligence processing unit is configured to recognize the rider corresponding to the state information detected by the detector.

With the rider recognition device for a human-powered vehicle according to the first aspect, the artificial intelligence processing unit is configured to recognize the rider in accordance with the state information. Thus, the usability is improved.

In accordance with a second aspect of the present disclosure, the rider recognition device according to the first aspect further comprises an input device configured to input personal information related to the rider. The artificial intelligence processing unit is configured to build a process for recognizing the rider in accordance with the personal information input from the input device and the state information detected by the detector.

With the rider recognition device for a human-powered vehicle according to the second aspect, the rider is appropriately recognized by a process that is built in accordance with the personal information and the state information.

In accordance with a third aspect of the present disclosure, the rider recognition device according to the first or second aspect is configured so that the artificial intelligence processing unit is configured to learn characteristics of changes in the state information detected by the detector.

With the rider recognition device for a human-powered vehicle according to the third aspect, the rider is appropriately recognized by learning characteristics of changes in the state information.

In accordance with a fourth aspect of the present disclosure, the rider recognition device according to the third aspect is configured so that the artificial intelligence processing unit further includes first storage configured to store learned information.

With the rider recognition device for a human-powered vehicle according to the fourth aspect, the rider is recognized by learned information stored in the first storage.

In accordance with a fifth aspect of the present disclosure, the rider recognition device according to the second aspect is configured so that the artificial intelligence processing unit is configured to learn characteristics of changes in the state information detected by the detector in association with the personal information.

With the rider recognition device for a human-powered vehicle according to the fifth aspect, characteristics of changes in the state information are learned so that the rider is appropriately recognized.

In accordance with a sixth aspect of the present disclosure, the rider recognition device according to the fifth aspect is configured so that the artificial intelligence processing unit further includes second storage configured to store learned information.

With the rider recognition device for a human-powered vehicle according to the sixth aspect, the rider is recognized by learned information stored in the second storage.

In accordance with a seventh aspect of the present disclosure, the rider recognition device according to any one of the first to sixth aspects is configured so that in a case in which the rider cannot be recognized, the artificial intelligence processing unit is configured to determine that a new rider is riding the human-powered vehicle.

With the rider recognition device for a human-powered vehicle according to the seventh aspect, the rider is further appropriately recognized.

In accordance with an eighth aspect of the present disclosure, the rider recognition device according to any one of the first to seventh aspects is configured so that the state of the human-powered vehicle includes at least one of a rotational speed of a crank of the human-powered vehicle, human driving force input to the crank, and a vehicle speed of the human-powered vehicle.

With the rider recognition device for a human-powered vehicle according to the eighth aspect, the rider is appropriately recognized in accordance with at least one of the rotational speed of the crank of the human-powered vehicle, human driving force input to the crank, and the vehicle speed of the human-powered vehicle, which have characteristics differing between riders.

In accordance with a ninth aspect of the present disclosure, the rider recognition device according to any one of the first to eighth aspects is configured so that the state of the rider includes at least one of posture of the rider and weight of the rider.

With the rider recognition device for a human-powered vehicle according to the ninth aspect, the rider is appropriately recognized in accordance with at least one of the posture of the rider and the weight of the rider, which differ between riders.

A control system of a human-powered vehicle according to a tenth aspect comprises the rider recognition device according to any one of the first to ninth aspects, an electric component provided on the human-powered vehicle, and a controller configured to control the electric component in accordance with the rider recognized by the artificial intelligence processing unit.

With the control system of a human-powered vehicle according to the tenth aspect, the electric component is controlled in accordance with the rider. Thus, the usability is improved.

In accordance with an eleventh aspect of the present disclosure, the control system according to the tenth aspect further comprises third storage configured to store setting information corresponding to the rider. In the controller controls the electric component in accordance with the setting information corresponding to the rider recognized by the artificial intelligence processing unit.

With the control system of a human-powered vehicle according to the eleventh aspect, the electric component is controlled in accordance with the setting information corresponding to the rider.

In accordance with a twelfth aspect of the present disclosure, the control system according to the eleventh aspect is configured so that the electric component includes at least one of a motor configured to assists propulsion of the human-powered vehicle, a transmission, an electric seatpost, and an electric suspension.

With the control system of a human-powered vehicle according to the twelfth aspect, at least one of the motor, the transmission, the electric seatpost, and the electric suspension is controlled in accordance with the rider.

In accordance with a thirteenth aspect of the present disclosure, the control system according to the eleventh or twelfth aspect is configured so that the electric component is configured to operate in a first state in which at least one function is restricted and a second state in which the at least one function is not restricted. The controller is configured to operate the electric component in the first state in a case in which the artificial intelligence processing unit cannot recognize the rider.

With the control system of a human-powered vehicle according to the thirteenth aspect, in a case in which the rider cannot be recognized, at least one function of the electric component is restricted.

In accordance with a fourteenth aspect of the present disclosure, the control system according to any one of the eleventh to thirteenth aspects is configured so that the electric component includes a switch configured to switch the electric component between a restriction state in which the electric component restricts traveling of the human-powered vehicle and a permission state in which the electric component permits traveling of the human-powered vehicle. The controller is configured to operate the switch in the restriction state in a case in which the artificial intelligence processing unit cannot recognize the rider.

With the control system of a human-powered vehicle according to the fourteenth aspect, in a case in which the rider cannot be recognized, traveling of the human-powered vehicle is restricted.

In accordance with a fifteenth aspect of the present disclosure, the control system according to the eleventh or twelfth aspect further comprises fourth storage configured to store personal information related to the rider. The electric component is configured to operate in a first state in which at least one function is restricted and a second state in which the at least one function is not restricted. The controller is configured to operate the electric component in the first state in a case in which the personal information related to the rider recognized by the artificial intelligence processing unit is not stored in the fourth storage.

With the control system of a human-powered vehicle according to the fifteenth aspect, in a case in which the personal information related to the recognized rider is not stored, at least one function of the electric component is restricted.

In accordance with a sixteenth aspect of the present disclosure, the control system according to any one of the eleventh to thirteenth aspects further comprises fourth storage configured to store personal information related to the rider. The electric component includes a switch configured to switch the electric component between a restriction state in which the electric component restricts traveling of the human-powered vehicle and a permission state in which the electric component permits traveling of the human-powered vehicle. The controller is configured to operate the switch in the restriction state in a case in which the personal information related to the rider recognized by the artificial intelligence processing unit is not stored in the fourth storage.

With the control system of a human-powered vehicle according to the sixteenth aspect, in a case in which the personal information related to the recognized rider is not stored in the fourth storage, traveling of the human-powered vehicle is restricted.

According to the present disclosure, the rider recognition device for a human-powered vehicle and the control system of a human-powered vehicle improve the usability.

EMBODIMENTS OF THE DISCLOSURE

Figure 1:
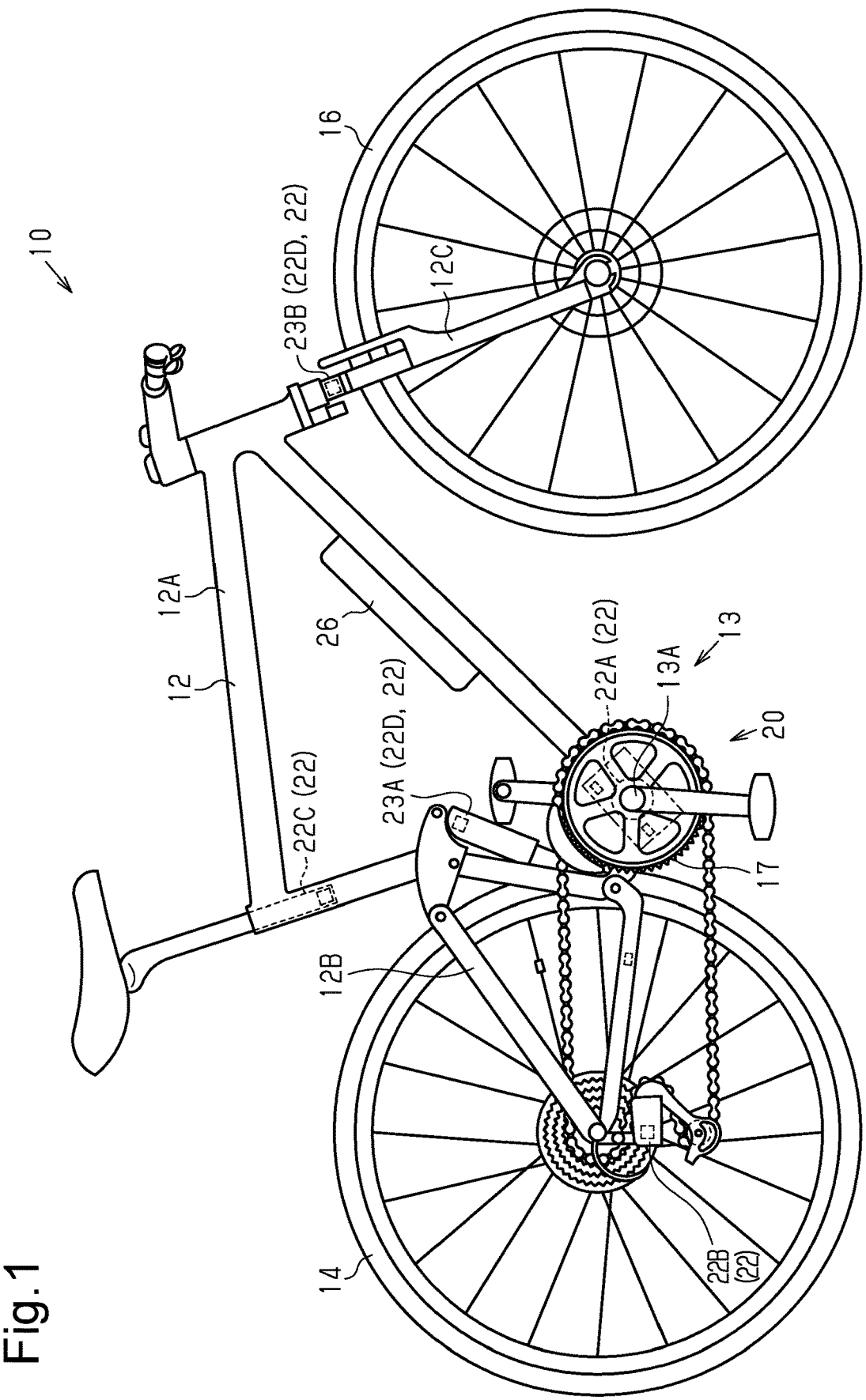
FIG. 1 is a side view of a human-powered vehicle including a first embodiment of a control system of the human-powered vehicle.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

First Embodiment

A first embodiment of a control system 20 of a human-powered vehicle 10 that includes a rider recognition device 30 for the human-powered vehicle 10 will now be described with reference to FIGS. 1 to 6. The rider recognition device 30 performs information processing related to the human-powered vehicle 10. The human-powered vehicle 10 is a vehicle that can be driven by at least human driving force. The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, and a recumbent bike and an electric bicycle (e-bike). The electric bicycle includes an electric assist bicycle configured to assist propulsion of the vehicle with an electric motor. In the embodiments described below, the human-powered vehicle 10 refers to a bicycle.

The control system 20 of the human-powered vehicle 10 includes the rider recognition device 30, an electric component 22 provided on the human-powered vehicle 10, and a controller 24 configured to control the electric component 22 in accordance with the rider recognized by an artificial intelligence processing unit 32 of the rider recognition device 30. Preferably, the control system 20 further includes a battery 26.

The battery 26 includes one or more battery cells. The battery cells include a rechargeable battery. The battery 26 is provided on the human-powered vehicle 10 and electrically connected to other electric components such as, the electric component 22, the controller 24, and, the rider recognition device 30 to supply electric power to the electric components. The battery 26 is connected to the controller 24 to perform wired or wireless communication with the controller 24. The battery 26 is configured to perform, for example, power line communication (PLC) with the controller 24. The battery 26 can be mounted on the exterior of a frame 12 of the human-powered vehicle 10 or can be at least partially accommodated in the frame 12.

The electric component 22 includes at least one of a motor 22A that assists propulsion of the human-powered vehicle 10, a transmission 22B, an electric seatpost 22C, and an electric suspension 22D.

Preferably, the motor 22A and a drive circuit of the motor 22A are provided on the same housing. The drive circuit controls electric power supplied from the battery 26 to the motor 22A. The drive circuit is connected to the controller 24 to perform wired or wireless communication with the controller 24. The drive circuit is configured to perform, for example, serial communication with the controller 24. The drive circuit drives the motor 22A in accordance with a control signal from the controller 24. The motor 22A assists propulsion of the human-powered vehicle 10. The motor 22A includes an electric motor. The motor 22A is provided to transmit rotation to a front wheel 16 or a power transmission path of human driving force that extends from pedals to a rear wheel 14. The motor 22A is provided on at least one of the frame 12 of the human-powered vehicle 10, the rear wheel 14, and the front wheel 16. In an example, the motor 22A is coupled to the power transmission path between a crankshaft 13A and a first rotary body. Preferably, a first one-way clutch is provided on the power transmission path between the motor 22A and the crankshaft 13A so that in a case in which the crankshaft 13A is rotated in a direction in which the human-powered vehicle 10 moves forward, the motor 22A will not be rotated by rotational force of a crank 13. Components other than the motor 22A and the drive circuit can be provided on the housing on which the motor 22A and the drive circuit are provided. For example, a speed reduction unit that reduces the speed of rotation of the motor 22A and outputs the rotation can be provided on the housing. The motor 22A configures a portion of a drive unit.

The transmission 22B is configured to change the ratio of rotational speed of a drive wheel to rotational speed of a rotary body to which human driving force is input in a stepped manner. The rotary body to which human driving force is input includes the crank 13. The transmission 22B is configured to be driven by an electric actuator. The controller 24 is configured to control the electric actuator. The transmission 22B configures a transmission device together with the electric actuator. The electric actuator includes an electric motor. The transmission 22B is used to change the ratio of rotational speed of the drive wheel to rotational speed of the crank 13. In the present embodiment, the transmission 22B is configured to change the ratio in a stepped manner. The electric actuator causes the transmission 22B to perform a shifting operation. The transmission 22B is controlled by the controller 24. The electric actuator is connected to the controller 24 to perform wired or wireless communication with the controller 24. The electric actuator is configured to perform, for example, power line communication (PLC) with the controller 24. The electric actuator causes the transmission 22B to perform a shifting operation in accordance with a control signal from the controller 24. The transmission 22B includes at least one of an internal shifting device and an external shifting device. The external shifting device includes at least one of a front derailleur and a rear derailleur.

The electric suspension 22D includes at least one of a rear suspension 23A and a front suspension 23B. The electric suspension 22D absorbs an impact applied to the wheels.

The rear suspension 23A is configured to be provided on the frame 12 of the human-powered vehicle 10. More specifically, the rear suspension 23A is coupled to a frame body 12A and a swing arm 12B that supports the rear wheel 14. The rear suspension 23A absorbs an impact applied to the rear wheel 14. The rear suspension 23A can be a hydraulic suspension or an air suspension. The rear suspension 23A includes a first part and a second part that is fitted into the first part and movable relative to the first part. The operation state of the rear suspension 23A includes a lock state that restricts relative movement of the first part and the second part and an unlock state that permits relative movement of the first part and the second part. The rear suspension 23A further includes an actuator. The actuator includes, for example, an electric motor. The actuator switches the operation state of the rear suspension 23A. The lock state of the rear suspension 23A can include a state in which in a case in which a strong force is applied to the rear suspension 23A, the first part slightly moves relative to the second part.

The front suspension 23B is configured to be provided between the frame 12 of the human-powered vehicle 10 and the front wheel 16. More specifically, the front suspension 23B is provided on a front fork 12C. The front suspension 23B absorbs an impact applied to the front wheel 16. The front suspension 23B can be a hydraulic suspension or an air suspension. The front suspension 23B includes a first part and a second part that is fitted into the first part and movable relative to the first part. The operation state of the front suspension 23B includes a lock state that restricts relative movement of the first part and the second part and an unlock state that permits relative movement of the first part and the second part. The front suspension 23B further includes an actuator. The actuator includes, for example, an electric motor. The actuator switches the operation state of the front suspension 23B. The lock state of the front suspension 23B can include a state in which in a case in which a strong force is applied to the front suspension 23B, the first part slightly moves relative to the second part.

The control system 20 of the human-powered vehicle 10 further includes an operating device 25. The operating device 25 is connected to the controller 24 to perform wired or wireless communication with the controller 24. The operating device 25 is configured to perform, for example, power line communication (PLC) with the controller 24. The operating device 25 includes, for example, an operating member, a detector that detects movement of the operating member, and an electric circuit that communicates with the controller 24 in accordance with an output signal from the detector. As the user operates the operating member, the electric circuit transmits a signal corresponding to the output signal of the detector to the controller 24. The operating member and the detector that detects movement of the operating member are configured to include a push switch, a lever-type switch, or a touchscreen. The operating device 25 is provided, for example, on a handlebar. In a case in which the operating device 25 is connected to the controller 24 through wireless communication, the operating device 25 includes a wireless communication unit. The operating device 25 includes at least one of a first operating device 25A that operates the transmission 22B, a second operating device 25B that changes the operation state of the motor 22A, which assists propulsion of the human-powered vehicle 10, a third operating device 25C that changes the operation state of the electric seatpost 22C, and a fourth operating device 25D that changes the operation state of the electric suspension 22D. The first operating device 25A includes, for example, an operating member that changes the transmission ratio. The second operating device 25B includes, for example, an operating member that changes the operation mode of the drive unit. The third operating device 25C includes, for example, an operating member that changes the height of the electric seatpost 22C. The fourth operating device 25D includes, for example, an operating member that changes the hardness of the electric suspension 22D.

The control system 20 of the human-powered vehicle 10 can further includes a display 27. The display 27 can be included in at least one of a smartphone, a tablet computer, and a cycle computer.

Figure 2:
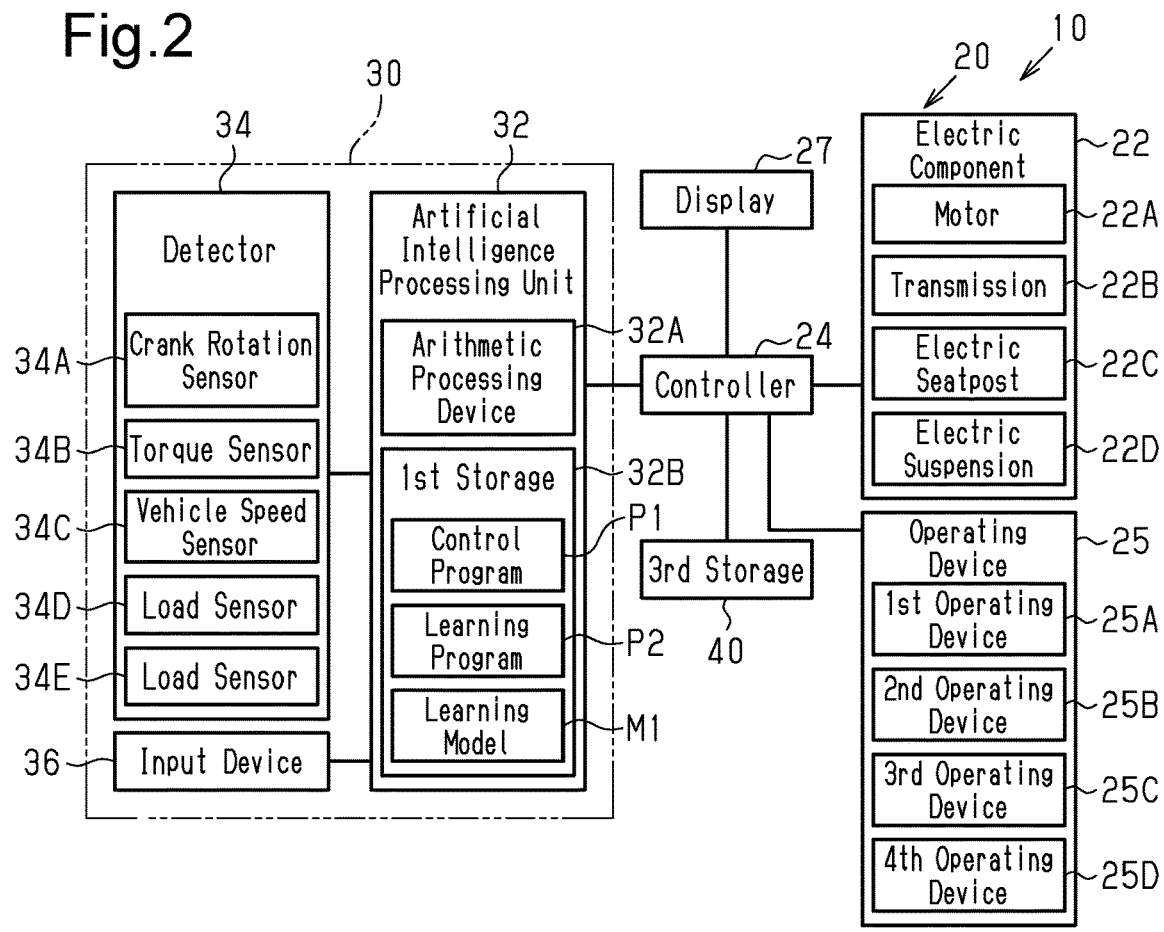
FIG. 2 is a block diagram showing the electrical configuration of the control system of the human-powered vehicle in the first embodiment.

As shown in FIG. 2, the rider recognition device 30 includes a detector 34 and the artificial intelligence processing unit 32. The detector 34 is configured to detect state information related to at least one of a state of the human-powered vehicle 10 and a state of the rider of the human-powered vehicle 10 while the human-powered vehicle 10 is traveling. The artificial intelligence processing unit 32 is configured to recognize the rider based on the state information detected by the detector 34. The output of the detector 34 can be input to the artificial intelligence processing unit 32 or can be input via a further device to the artificial intelligence processing unit 32. The further device is, for example, the controller 24 controlling the electric component 22.

Preferably, the artificial intelligence processing unit 32 is configured to be provided on the human-powered vehicle 10. The artificial intelligence processing unit 32 can be directly mounted on the frame 12 or can be included in the electric component 22, the battery 26, or a smartphone. The artificial intelligence processing unit 32 can be included in at least one of a tablet computer and a cycle computer instead of or in addition to a smartphone. Preferably, the artificial intelligence processing unit 32 is provided on the housing of at least one of a smartphone, a tablet computer, and a cycle computer. Preferably, a mounting portion for mounting the artificial intelligence processing unit 32 on the human-powered vehicle 10 is provided on at least one of the artificial intelligence processing unit 32 and the human-powered vehicle 10. The mounting portion allows the artificial intelligence processing unit 32 to be detachably mounted on the human-powered vehicle 10. The artificial intelligence processing unit 32 can be unremovably provided on the human-powered vehicle 10.

The artificial intelligence processing unit 32 includes an arithmetic processing device 32A that is configured to execute predetermined programs in order to perform the functions of the artificial intelligence processing unit 32. The arithmetic processing device 32A includes, for example, a central processing unit (CPU) or a micro processing unit (MPU).

Preferably, the arithmetic processing device 32A includes a graphics processing unit (GPU) in addition to the CPU or MPU.

The arithmetic processing device 32A can include a field-programmable gate array (FPGA). The artificial intelligence processing unit 32 can include multiple arithmetic processing devices 32A.

The artificial intelligence processing unit 32 can include multiple arithmetic processing devices 32A separately provided at different locations.

The artificial intelligence processing unit 32 further includes first storage 32B. The first storage 32B is configured to store a predetermined control program P1, a learning program P2, and a learning model M1. The first storage 32B includes, for example, a nonvolatile memory and a volatile memory. The artificial intelligence processing unit 32 uses a learning algorithm to update the learning model M1 that recognizes the rider in accordance with the input state information based on the learning program P2. The learning algorithm includes machine learning, deep learning, or deep reinforcement learning. The learning algorithm includes, for example, at least one of supervised learning, unsupervised learning, and reinforcement learning. As long as the learning algorithm is configured to update the learning model M1 through a process used in the field of artificial intelligence, a process other than those described in this specification can be used. Preferably, the learning process for updating the learning model M1 is performed by the GPU. The learning algorithm can use neural networks (hereafter, referred to as NN). The learning algorithm can use recurrent neural networks.

Preferably, the artificial intelligence processing unit 32 is configured to operate in a learning mode and a control mode. When supplied with power, the artificial intelligence processing unit 32 is configured to operate in the control mode. The artificial intelligence processing unit 32 can be operated in the learning mode, for example, by inputting predetermined information to an input device 36. The predetermined information includes, for example, a password. The artificial intelligence processing unit 32 can be operated in the learning mode, for example, by performing an operation for setting the learning mode on the operating device 25. In a case in which the artificial intelligence processing unit 32 operates in the learning mode, the artificial intelligence processing unit 32 is configured to serve as a generator that generates the learning model M1 based on the learning program P2 using the learning algorithm. In a case in which the artificial intelligence processing unit 32 operates in the control mode, the artificial intelligence processing unit 32 is configured to serve as a controller that outputs information that is output by processing information obtained by the detector 34 using the learning model M1 based on the control program P1.

The state of the human-powered vehicle 10 includes at least one of rotational speed of the crank 13 of the human-powered vehicle 10, human driving force that is input to the crank 13, and vehicle speed of the human-powered vehicle 10. In a case in which the detector 34 detects the state of the human-powered vehicle 10, the detector 34 includes at least one of a crank rotation sensor 34A, a torque sensor 34B, and a vehicle speed sensor 34C.

Preferably, in a case in which the state of the human-powered vehicle 10 includes the rotational speed of the crank 13, the detector 34 includes the crank rotation sensor 34A. The crank rotation sensor 34A detects information related to the rotational speed of the crank 13. The crank rotation sensor 34A is attached to the frame of the human-powered vehicle 10 or the housing on which the motor is provided. The crank rotation sensor 34A is configured to include a magnetic sensor that outputs a signal corresponding to the strength of a magnetic field. An annular magnet having a magnetic field, the strength of which changes in the circumferential direction, is provided on the crankshaft 13A, a member that rotates in cooperation with the crankshaft 13A, or the power transmission path between the crankshaft 13A and a front sprocket 17. The magnet outputs a signal corresponding to the rotational speed of the crank 13. The crank rotation sensor 34A can be provided on a member that rotates integrally with the crankshaft 13A on the power transmission path of human driving force between the crankshaft 13A and the front sprocket 17. For example, in a case in which a second one-way clutch is not provided between the crankshaft 13A and the front sprocket 17, the magnet can be provided on the front sprocket 17. The crank rotation sensor 34A can include, for example, an optical sensor, an acceleration sensor, or a torque sensor instead of the magnetic sensor.

Preferably, in a case in which the state of the human-powered vehicle 10 includes the human driving force input to the crank 13, the detector 34 includes the torque sensor 34B. The torque sensor 34B detects information related to torque of human driving force that is input to the crank 13. For example, in a case in which a second one-way clutch is provided on the power transmission path, the torque sensor 34B is provided at the upstream side of the second one-way clutch in the power transmission path. The torque sensor 34B includes, for example, a strain sensor, a magnetostriction sensor, or a pressure sensor. The strain sensor includes a strain gauge. The torque sensor 34B is provided on or near a member included in the power transmission path. The member included in the power transmission path is, for example, the crankshaft 13A, a crank arm, or a pedal. The torque sensor 34B can include a wireless or wired communicator. The human driving force can include power of the human driving force. In this case, preferably, the detector 34 includes the torque sensor 34B and the crank rotation sensor 34A.

Preferably, in a case in which the state of the human-powered vehicle 10 includes the vehicle speed of the human-powered vehicle 10, the detector 34 includes the vehicle speed sensor 34C. The vehicle speed sensor 34C detects information related to rotational speed of a wheel of the human-powered vehicle 10. The vehicle speed sensor 34C outputs a signal corresponding to the rotational speed of the wheel. The vehicle speed of the human-powered vehicle is calculated based on the rotational speed of the wheel. Preferably, the vehicle speed sensor 34C includes a magnetic reed configuring a reed switch or a Hall element. The vehicle speed sensor 34C can be attached to the chainstay of the frame of the human-powered vehicle 10 and configured to detect a magnet attached to the rear wheel 14 or can be provided on the front fork 12C and configured to detect a magnet attached to the front wheel 16.

The state of the rider includes at least one of posture of the rider and weight of the rider. The state of the rider includes at least one of posture of the rider at a predetermined point in time, weight of the rider at a predetermined point in time, change in posture of the rider, and shifting of weight of the rider. Preferably, in a case in which the detector 34 is configured to detect at least one of the posture of the rider and the weight of the rider, the detector 34 includes at least one of a load sensor 34D and a load sensor 34E.

Preferably, in a case in which the state of the rider includes the posture of the rider and the change in the posture of the rider, the detector 34 includes the load sensor 34D. The load sensor 34D outputs a signal corresponding to the posture of the rider. The load sensor 34D is provided, for example, on at least one of a saddle or a seatpost. In particular, the output of the load sensor 34D greatly changes between a case in which the rider is standing and pedaling and a case in which the rider is seated and pedaling. The load applied by the rider to the saddle and the seatpost changes in accordance with the posture of the rider. Thus, the posture of the rider is detected based on the output of the load sensor 34D. Instead of the load sensor 34D, a camera can be used to detect the posture of the rider.

Preferably, in a case in which the state of the rider includes the weight of the rider and the weight shifting, the detector 34 includes the load sensor 34E. The load sensor 34E outputs a signal corresponding to the weight of the rider. The load sensor 34E is provided, for example, on at least one of the saddle, the seatpost, and an axle. The load sensor 34E can be configured separately from the load sensor 34D or can be configured by the load sensor 34D.

The rider recognition device 30 can further include the input device 36 configured to input personal information related to the rider. The input device 36 includes at least one of a touchscreen, a keyboard, and a button. The artificial intelligence processing unit 32 is configured to build a process for recognizing the rider in accordance with the personal information input from the input device 36 and the state information detected by the detector 34. Preferably, the personal information includes identification information. Preferably, the identification information includes at least one of a numeral and a letter. The personal information can include a password. The artificial intelligence processing unit 32 is configured to learn characteristics of changes in the state information detected by the detector 34. The artificial intelligence processing unit 32 can learn characteristics of changes whenever the detector 34 detects the state information or can obtain history of the state information detected by the detector 34 and learn characteristics of changes in accordance with the history of the state information. Preferably, in a case in which the artificial intelligence processing unit 32 is configured to learn characteristics of changes in accordance with the history of the state information, the control system 20 includes storage that stores the history of the state information.

The artificial intelligence processing unit 32 further includes the first storage 32B is configured to store learned information. The first storage 32B includes, for example, a nonvolatile memory. The information learned by the artificial intelligence processing unit 32 and stored in the first storage 32B includes the learning model M1. For example, the artificial intelligence processing unit 32 is configured to generate personal information related to the recognized rider and stores the personal information in the first storage 32B. The personal information related to the rider and stored in the first storage 32B includes, for example, identification information. In a case in which the artificial intelligence processing unit 32 recognizes the rider, the personal information related to the rider can be shown on the display 27. In this case, the rider can acknowledge the personal information related to the rider.

Preferably, in a case in which the rider cannot be recognized, the artificial intelligence processing unit 32 determines that a new rider is riding the human-powered vehicle 10. For example, in a case in which output information that is output using the learning model M1 does not correspond to the personal information related to the rider, the artificial intelligence processing unit 32 is configured to determine that a new rider is riding the human-powered vehicle 10. The case in which the rider cannot be recognized includes, for example, at least one of a first example, a second example, and a third example described below. In the first example, the artificial intelligence processing unit 32 is configured to store riders recognized in the past in the first storage 32B in association with personal information, specifies the personal information based on a rider recognized by the learning model M1 and the personal information stored in the first storage 32B, and displays the specified personal information on the display 27. In a case in which the rider enters an input indicating that the personal information displayed on the display 27 is incorrect to the input device 36, the artificial intelligence processing unit 32 is configured to determine that the rider cannot be recognized. In the second example, the artificial intelligence processing unit 32 is configured to store riders recognized in the past in the first storage 32B in association with personal information and specifies personal information using the learning model M1 and the personal information stored in the first storage 32B. If the specified personal information differs from personal information input into the input device 36, the artificial intelligence processing unit 32 determines that the rider cannot be recognized. In the third example, the artificial intelligence processing unit 32 is configured to store predetermined information related to riders recognized in the past in the first storage 32B. In a case in which predetermined information related to a rider recognized by the learning model M1 differs from the predetermined information related to any rider stored in the first storage 32B, the artificial intelligence processing unit 32 determines that the rider cannot be recognized. The predetermined information related to a rider includes, for example, at least one of characteristics of changes in the state information.

Figure 3:
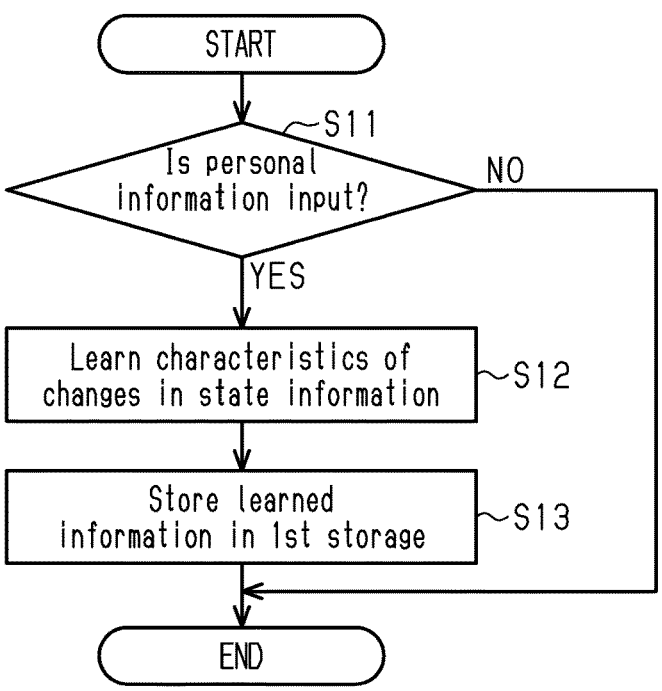
FIG. 3 is a flowchart of a process for obtaining characteristics of changes in state information executed by the artificial intelligence processing unit shown in FIG. 2.

A process for learning characteristics of changes in the state information will now be described with reference to FIG. 3. The process for learning characteristics of changes in the state information includes a process for updating the learning model M1. In a case in which the artificial intelligence processing unit 32 is supplied with power and the learning mode is set, the artificial intelligence processing unit 32 starts the process and proceeds to step S11 in the flowchart shown in FIG. 3.

In step S11, the artificial intelligence processing unit 32 determines whether or not personal information is input. For example, in a case in which personal information is input to the input device 36, the artificial intelligence processing unit 32 determines that personal information is input. In a case in which personal information is not input, the artificial intelligence processing unit 32 ends the process. In a case in which personal information is input, the artificial intelligence processing unit 32 proceeds to step S12.

In step S12, the artificial intelligence processing unit 32 learns characteristics of changes in the state information detected by the detector 34 and proceeds to step S13. The artificial intelligence processing unit 32 can be configured to proceed to step S13 in a case in which the learning of characteristics of changes in the state information is completed. Alternatively, the artificial intelligence processing unit 32 can be configured to proceed to step S13 in a case in which the time for learning characteristics of changes in the state information reaches a predetermined time or a number of times that predetermined information is detected reaches a predetermined number of times. Alternatively, the artificial intelligence processing unit 32 can be configured to proceed to step S13 in a case in which the rider operates the operating device 25 to stop the learning of characteristics of changes in the state information, in a case in which the rider operates the input device 36 to stop the learning of characteristics of changes in the state information, or in a case in which the human-powered vehicle 10 has been stopped for a first predetermined time or longer. The first predetermined time is longer than time for which the human-powered vehicle 10 temporarily stops during traveling. Preferably, after step S12, the artificial intelligence processing unit 32 changes from the learning mode to the control mode.

In step S13, the artificial intelligence processing unit 32 stores the learned information in the first storage 32B and ends the process. In step S13, the artificial intelligence processing unit 32 stores the learned learning model M1 in the first storage 32B.

In step S11, the artificial intelligence processing unit 32 can proceed to step S12 in a case in which riding starts instead of in a case in which personal information is input. Determination of the starting of riding can be made in the same manner as step S21 in FIG. 4. In a case in which the artificial intelligence processing unit 32 starts to learn characteristics of changes in the state information in accordance with a process other than the inputting of personal information, the input device 36 can be omitted from the rider recognition device 30. In a case in which the learned learning model M1 is stored in the first storage 32B, the learning mode can be omitted. In a case in which the artificial intelligence processing unit 32 starts to learn characteristics of changes in the state information in accordance with a process other than the inputting of personal information, for example, the starting of riding, the artificial intelligence processing unit 32 can be configured to change to the learning mode.

For example, in a case in which the artificial intelligence processing unit 32 operates in the learning mode and output information that is output using the learning model M1 does not correspond to the personal information related to the rider, the artificial intelligence processing unit 32 can adjust, for example, at least one of "weight" and "bias" in neural networks and update the learning model M1. In this case, after step S13, the artificial intelligence processing unit 32 shows the output information that is output using the learning model M1 on the display 27. Preferably, the output information shown on the display 27 includes identification information of the rider. The rider inputs a result determining whether or not the output information shown on the display 27 is correct, for example, to the input device 36. For example, in a case in which the rider inputs a result determining that the output information shown on the display 27 is incorrect, the artificial intelligence processing unit 32 determines that the output information that is output using the learning model M1 does not correspond to the personal information related to the rider. For example, in a case in which the output information that is output using the learning model M1 does not correspond to the personal information related to the rider, the artificial intelligence processing unit 32 adjusts, for example, at least one of "weight" and "bias" in neural networks and update the learning model M1.

Figure 4:
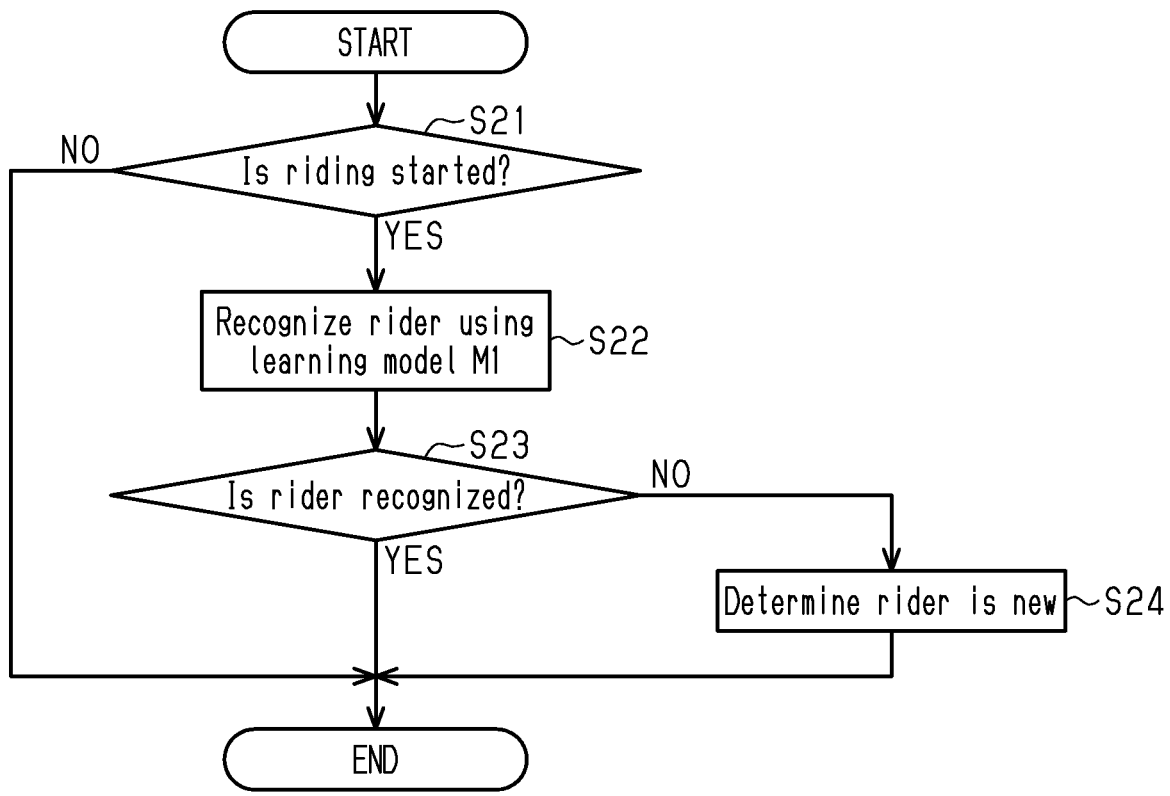
FIG. 4 is a flowchart of a process for recognizing a rider executed by the artificial intelligence processing unit shown in FIG. 2.

A process for recognizing the rider will now be described with reference to FIG. 4. In a case in which the artificial intelligence processing unit 32 is supplied with power, the artificial intelligence processing unit 32 starts the process and proceeds to step S21 in the flowchart shown in FIG. 4. Additionally, in a case in which the learning mode is switched to the control mode, the artificial intelligence processing unit 32 can start the process and proceed to step S21 in the flowchart shown in FIG. 4.

In step S21, the artificial intelligence processing unit 32 determines whether or not riding starts. For example, in at least one of a case in which human driving force is input to the crank 13 of the human-powered vehicle 10, a case in which the crank 13 starts to rotate, a case in which a load is applied to the saddle, and a case in which the operating device 25 is operated, the artificial intelligence processing unit 32 determines that riding has started. In a case in which the artificial intelligence processing unit 32 determines that riding has not started, the artificial intelligence processing unit 32 ends the process. In a case in which the artificial intelligence processing unit 32 determines that riding has started, the artificial intelligence processing unit 32 proceeds to step S22. In a case in which the rider recognition device 30 or a system including the rider recognition device 30 includes a switch that turns the power on and off, the artificial intelligence processing unit 32 can determine in step S21 that riding has started in a case in which the power is turned on and the artificial intelligence processing unit 32 is supplied with power.

In step S22, the artificial intelligence processing unit 32 recognizes the rider using the learning model M1 and proceeds to step S23. In step S23, the artificial intelligence processing unit 32 determines whether or not the rider is recognized. For example, in a case of the first example, the second example, or the third example of cases in which the rider cannot be recognized, the artificial intelligence processing unit 32 determines that the rider cannot be recognized. In a case in which the artificial intelligence processing unit 32 recognizes the rider, the artificial intelligence processing unit 32 ends the process. In a case in which the artificial intelligence processing unit 32 cannot recognize the rider, the artificial intelligence processing unit 32 proceeds to step S24. In step S24, the artificial intelligence processing unit 32 determines that the present rider is a new rider and ends the process.

As shown in FIG. 2, preferably, the control system 20 further includes third storage 40 configured to store setting information corresponding to the rider. The controller 24 controls the electric component 22 in accordance with the setting information corresponding to the rider recognized by the artificial intelligence processing unit 32. The third storage 40 includes, for example, a nonvolatile memory. The setting information includes, for example, information related to a combination of a parameter related to at least one of a traveling state and traveling environment of the human-powered vehicle 10 with a control state of the electric component 22.

Figure 5:
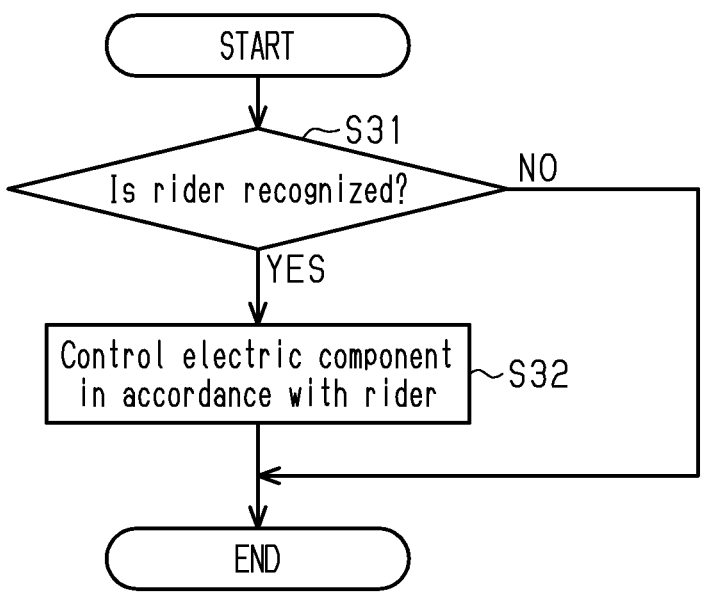
FIG. 5 is a flowchart of a process for controlling an electric component in accordance with the rider executed by the controller shown in FIG. 2.
Figure 6:
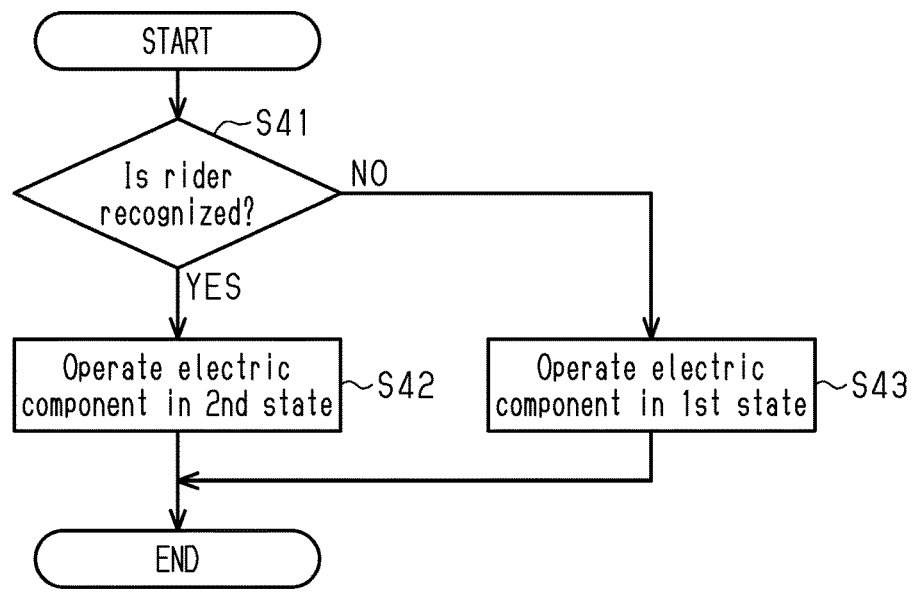
FIG. 6 is a flowchart of a process for switching a control state of the electric component executed by the controller shown in FIG. 2.

A process for controlling the electric component 22 in accordance with the rider will now be described with reference to FIG. 5. In a case in which the controller 24 is supplied with power, the controller 24 starts the process and proceeds to step S31 in the flowchart shown in FIG. 5. Additionally, in a case in which the learning mode is switched to the control mode, the artificial intelligence processing unit 32 can start the process and proceed to step S31 in the flowchart shown in FIG. 5.

In step S31, the controller 24 determines whether or not the rider is recognized. In a case in which the rider is recognized by the recognition process shown in FIG. 4, the controller 24 determines that the rider is recognized. In a case in which the rider cannot be recognized, the controller 24 ends the process. In a case in which the rider is recognized, the controller 24 proceeds to step S32.

In step S32, the controller 24 controls the electric component 22 in accordance with the rider and ends the process. More specifically, the controller 24 obtains the setting information corresponding to the rider from the third storage 40 and controls the electric component 22 in accordance with the setting information. In a case in which the rider cannot be recognized and a case in which the recognition process shown in FIG. 4 determines that the rider is a new rider, the artificial intelligence processing unit 32 can control the electric component 22 in accordance with default setting information stored in advance.

In a case in which the electric component 22 is configured to operate in a first state in which at least one function is restricted and a second state in which at least one function is not restricted and the artificial intelligence processing unit 32 cannot recognize the rider, the controller 24 can operate the electric component 22 in the first state. In a case in which the electric component 22 includes the motor 22A, the controller 24, for example, prohibits driving of the motor 22A in the first state. In a case in which the electric component 22 includes the transmission 22B, the controller 24, for example, does not change the transmission ratio of the transmission 22B in the first state. In a case in which the electric component 22 includes the electric seatpost 22C, the controller 24, for example, does not change the height of the seatpost in the first state. In a case in which the electric component 22 includes the electric suspension 22D, the controller 24, for example, maintains the lock state in the first state.

A process for changing the operation state of the electric component 22 will now be described with reference to FIG.

6. In a case in which the controller 24 is supplied with power, the controller 24 starts the process and proceeds to step S41 in the flowchart shown in FIG. 6. Additionally, in a case in which the learning mode is switched to the control mode, the artificial intelligence processing unit 32 can start the process and proceed to step S41 in the flowchart shown in FIG. 6.

In step S41, the controller 24 determines whether or not the rider is recognized. In a case in which the rider is recognized by the recognition process shown in FIG. 4, the controller 24 determines that the rider is recognized. In a case in which the rider cannot be recognized, the controller 24 ends the process. In a case in which the rider is recognized, the controller 24 proceeds to step S42. In step S42, the controller 24 operates the electric component 22 in the second state.

In a case in which the rider is not recognized in step S41, the controller 24 proceeds to step S43. In step S43, the controller 24 operates the electric component 22 in the first state. Additionally, in a case in which the recognition process shown in FIG. 4 determines that the rider is a new rider, the controller 24 can proceed to step S43.

Second Embodiment

A second embodiment of a control system 20 will now be described with reference to FIGS. 7 to 9. The control system 20 of the second embodiment differs from the control system 20 of the first embodiment in that the artificial intelligence processing unit 32 learns characteristics of changes in the state information in association with personal information but otherwise has the same configuration as the control system 20 of the first embodiment. The same reference characters are given to those elements that are the same as the corresponding elements of the first embodiment. Such elements will not be described in detail.

Figure 7:
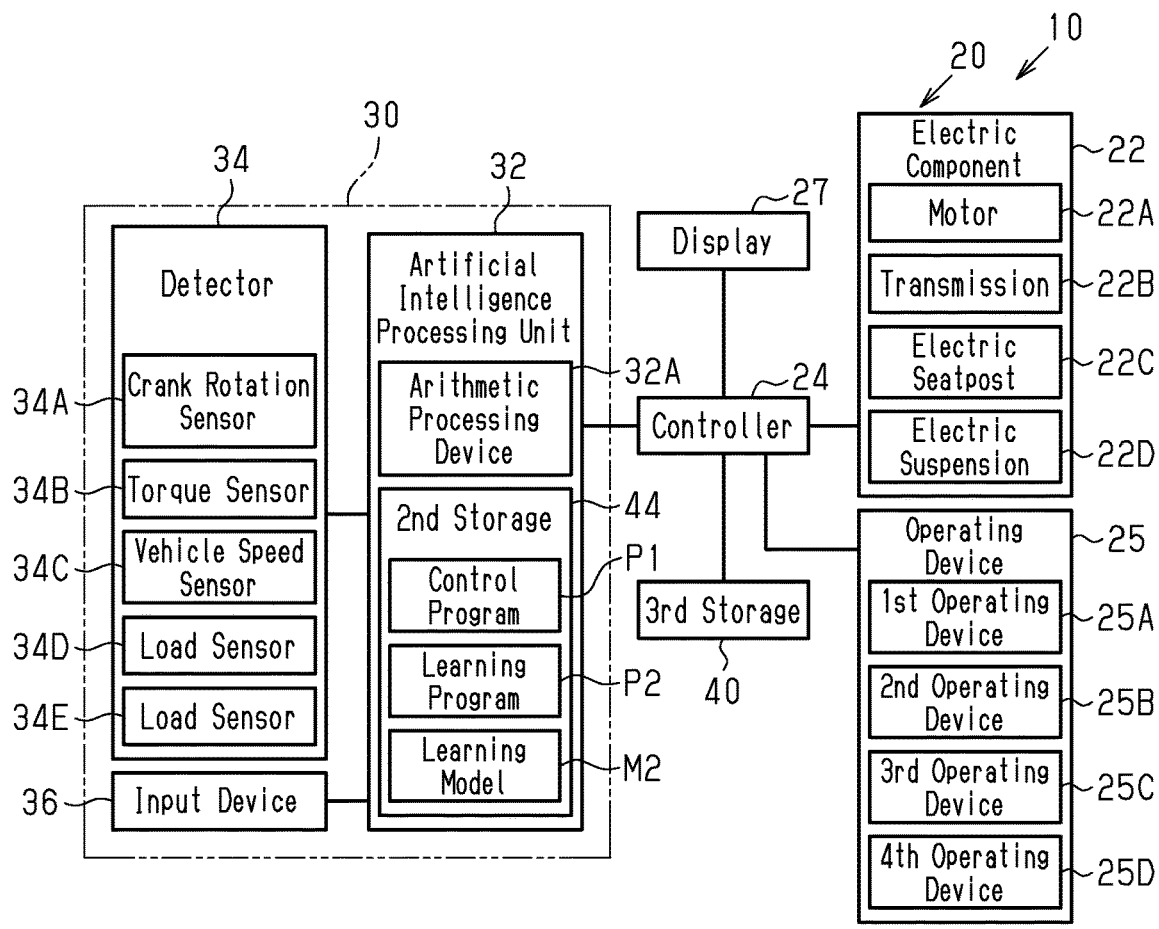
FIG. 7 is a block diagram showing the electrical configuration of a control system of a human-powered vehicle in a second embodiment.
Figure 8:
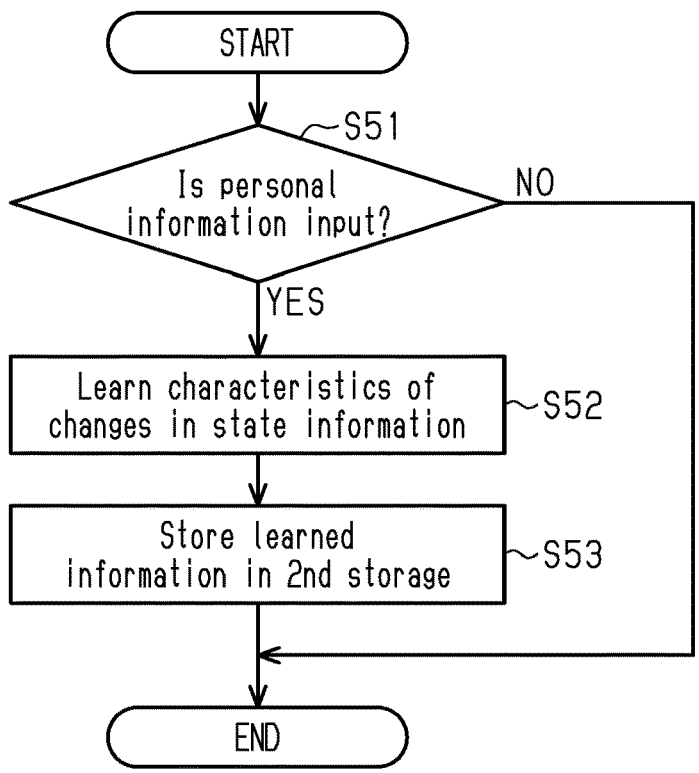
FIG. 8 is a flowchart of a process for generating specific information executed by the artificial intelligence processing unit shown in FIG. 7.

FIG. 7 shows an artificial intelligence processing unit 32 is configured to learn characteristics of changes in the state information detected by the detector 34 in association with personal information. The artificial intelligence processing unit 32 further includes second storage 44 configured to store learned information. The second storage 44 includes, for example, a nonvolatile memory. The information learned by the artificial intelligence processing unit 32 and stored in the second storage 44 includes a learning model M2 that distinguishes multiple riders from each other.

A process for learning characteristics of changes in state information for each rider will now be described with reference to FIG. 8. The process for learning characteristics of changes in state information for each rider includes a process for updating the learning model M2. In a case in which the artificial intelligence processing unit 32 is supplied with power and is set to the learning mode, the artificial intelligence processing unit 32 starts the process and proceeds to step S51 in the flowchart shown in FIG. 8.

In step S51, the artificial intelligence processing unit 32 determines whether or not personal information is input. In a case in which personal information is not input, the artificial intelligence processing unit 32 ends the process. In a case in which personal information is input, the artificial intelligence processing unit 32 proceeds to step S52.

In step S52, the artificial intelligence processing unit 32 learns characteristics of changes in the state information detected by the detector 34 and proceeds to step S53. The artificial intelligence processing unit 32 can be configured to proceed to step S53 in a case in which the learning of characteristics of changes in the state information is completed. The artificial intelligence processing unit 32 can be configured to proceed to step S53 in a case in which the time for learning characteristics of changes in the state information reaches a predetermined time or the number of times that predetermined information is detected reaches a predetermined number of times. Alternatively, the artificial intelligence processing unit 32 can be configured to proceed to step S53 in a case in which the rider operates the operating device 25 to stop the learning of characteristics of changes in the state information and a case in which the human-powered vehicle 10 has been stopped for the first predetermined time or longer.

In step S53, the artificial intelligence processing unit 32 stores the learned information in the second storage 44 and ends the process. In step S53, the artificial intelligence processing unit 32 stores the learned learning model M2 in the second storage 44.

For example, in a case in which the artificial intelligence processing unit 32 operates in the learning mode and output information that is output using the learning model M2 does not correspond to the personal information related to the rider, the artificial intelligence processing unit 32 can adjust, for example, at least one of "weight" and "bias" in neural networks and update the learning model M2. In this case, after step S53, the artificial intelligence processing unit 32 shows the output information that is output using the learning model M2 on the display 27. Preferably, the output information shown on the display 27 includes identification information of the rider. The rider inputs a result determining whether or not the output information shown on the display 27 is correct, for example, to the input device 36. For example, in a case in which the rider inputs a result determining that the output information shown on the display 27 is incorrect, the artificial intelligence processing unit 32 determines that the output information that is output using the learning model M2 does not correspond to the personal information related to the rider. For example, in a case in which the output information that is output using the learning model M2 does not correspond to the personal information related to the rider, the artificial intelligence processing unit 32 adjusts, for example, at least one of "weight" and "bias" in neural networks and update the learning model M2.

A process for recognizing the rider will now be described with reference to FIG. 9. In a case in which the artificial intelligence processing unit 32 is supplied with power, the artificial intelligence processing unit 32 starts the process and proceeds to step S61 in the flowchart shown in FIG. 9.

In step S61, the artificial intelligence processing unit 32 determines whether or not riding starts. For example, in at least one of a case in which human driving force is input to the crank 13 of the human-powered vehicle 10, a case in which the crank 13 starts to rotate, a case in which a load is applied to the saddle, and a case in which the operating device 25 is operated, the artificial intelligence processing unit 32 determines that riding has started. In a case in which the artificial intelligence processing unit 32 determines that riding has not started, the artificial intelligence processing unit 32 ends the process. In a case in which the artificial intelligence processing unit 32 determines that riding has started, the artificial intelligence processing unit 32 proceeds to step S62. In a case in which the rider recognition device 30 or a system including the rider recognition device 30 includes a switch that turns the power on and off, the artificial intelligence processing unit 32 can determine in step S61 that riding has started in a case in which the power is turned on and the artificial intelligence processing unit 32 is supplied with power.

In step S62, the artificial intelligence processing unit 32 recognizes the rider using the learning model M2 and proceeds to step S63. In step S63, the artificial intelligence processing unit 32 determines whether or not the rider is recognized. For example, in a case of the first example, the second example, or the third example of cases in which the rider cannot be recognized, the artificial intelligence processing unit 32 determines that the rider cannot be recognized. In a case in which the artificial intelligence processing unit 32 recognizes the rider, the artificial intelligence processing unit 32 ends the process. In a case in which the artificial intelligence processing unit 32 cannot recognize the rider, the artificial intelligence processing unit 32 proceeds to step S64. In step S64, the artificial intelligence processing unit 32 determines that the present rider is a new rider and ends the process.

Figure 9:
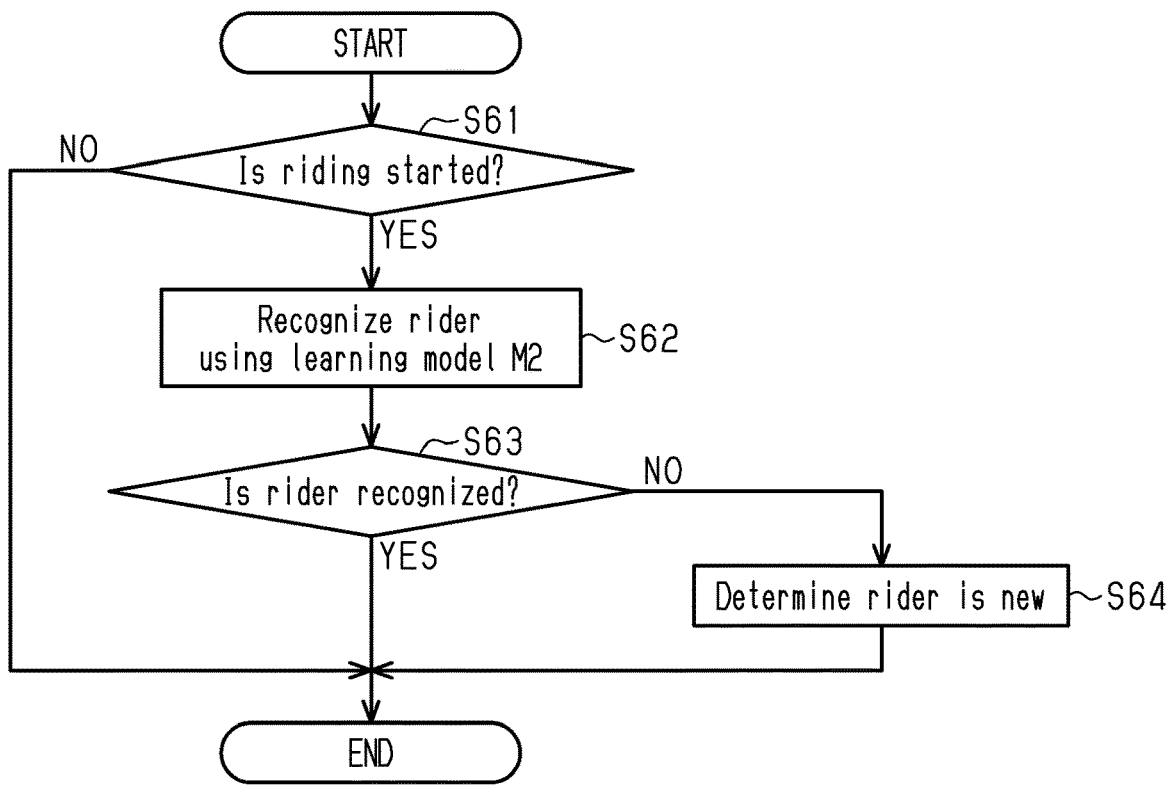
FIG. 9 is a flowchart of a process for recognizing a rider executed by the artificial intelligence processing unit shown in FIG. 7.

The controller 24 can control the electric component 22 in accordance with the rider recognized by the process shown in FIG. 9. For example, in a case in which the rider is recognized by the process shown in FIG. 9, the controller 24 makes an affirmative determination in step S31 of FIG. 5 and step S41 in FIG. 6 of the first embodiment.

Third Embodiment

A third embodiment of a control system 20 will now be described with reference to FIGS. 10 and 11. The control system 20 of the third embodiment differs from the control system 20 of the first embodiment in that the electric component 22 includes a switch 46 but otherwise has the same configuration as the control system 20 of the first embodiment. The same reference characters are given to those elements that are the same as the corresponding elements of the first embodiment. Such elements will not be described in detail.

Figure 10:
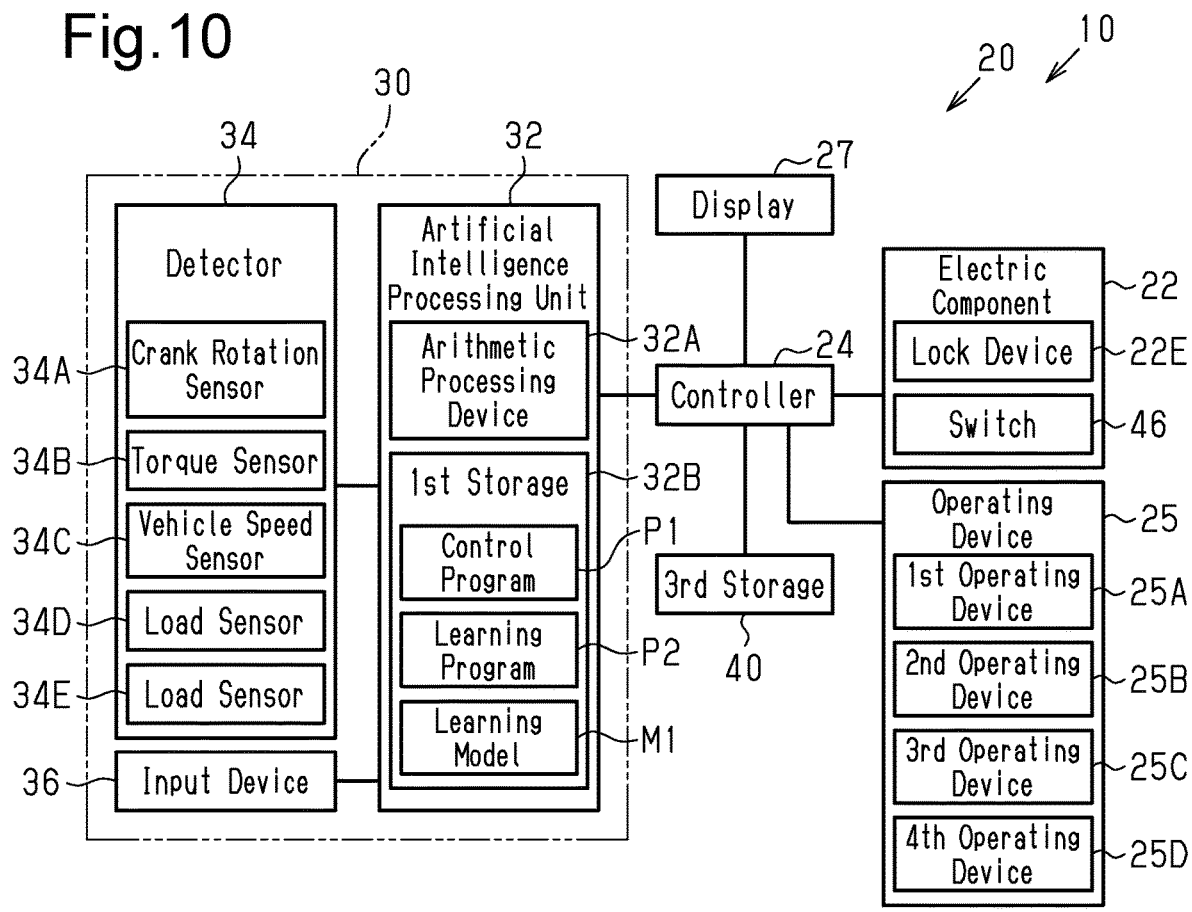
FIG. 10 is a block diagram showing the electrical configuration of a control system of a human-powered vehicle in a third embodiment.
Figure 11:
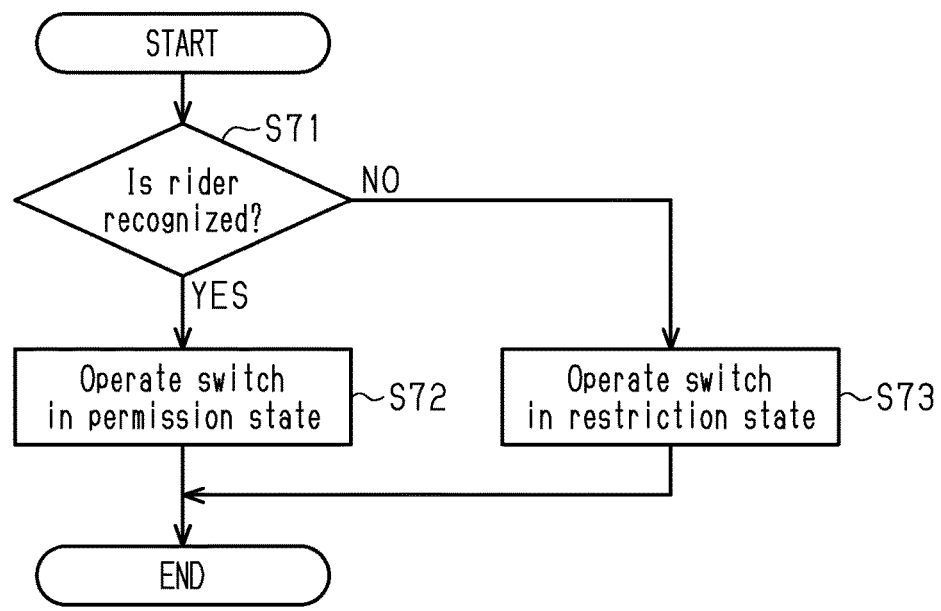
FIG. 11 is a flowchart of a process for controlling an electric component in accordance with the rider executed by the controller shown in FIG. 10.

FIG. 10 shows an electric component 22 including the switch 46 that switches between a restriction state that restricts traveling of the human-powered vehicle 10 and a permission state that permits traveling of the human-powered vehicle 10. In a case in which the artificial intelligence processing unit 32 cannot recognize the rider, the controller 24 operates the switch 46 in the restriction state.

The switch 46 is configured to include, for example, a lock device 22E. In this case, the electric component 22 includes the lock device 22E. Preferably, the lock device 22E includes an electric actuator that switches between the restriction state and the permission state. The lock device 22E is provided on, at least one of the frame 12 of the human-powered vehicle 10 and a drive unit. Preferably, the switch 46 is configured to restrict rotation of at least one of the rear wheel 14, the front wheel 16, and the crankshaft 13A in the restriction state. In the restriction state, the switch 46 can be configured to prohibit rotation of at least one of the rear wheel 14, the front wheel 16, and the crankshaft 13A or can be configured to apply brakes to the rotation. In a case in which the switch 46 is in the permission state, the switch 46 is configured not to restrict rotation of the rear wheel 14, the front wheel 16, and the crankshaft 13A.

Preferably, the switch 46 is configured to switch between the restriction state and the permission state using the operating device 25 or an electronic key that switches between the restriction state and the permission state.

A process for switching the state of the switch 46 will now be described with reference to FIG. 11. In a case in which the controller 24 is supplied with power, the controller 24 starts the process and proceeds to step S71 in the flowchart shown in FIG. 11.

In step S71, the controller 24 determines whether or not the rider is recognized. For example, in a case in which the rider is recognized by the recognition process shown in FIG. 4, the controller 24 determines that the rider is recognized. In a case in which it is determined that the rider is recognized, the controller 24 proceeds to step S72. In step S72, the controller 24 operates the switch 46 in the permission state and ends the process. In a case in which the switch 46 is in the permission state, the controller 24 maintains the permission state of the switch 46.

In a case in which it is determined in step S71 that the rider cannot be recognized, the controller 24 proceeds to step S73. In step S73, the controller 24 operates the switch 46 in the restriction state and ends the process.

Fourth Embodiment

Figure 12:
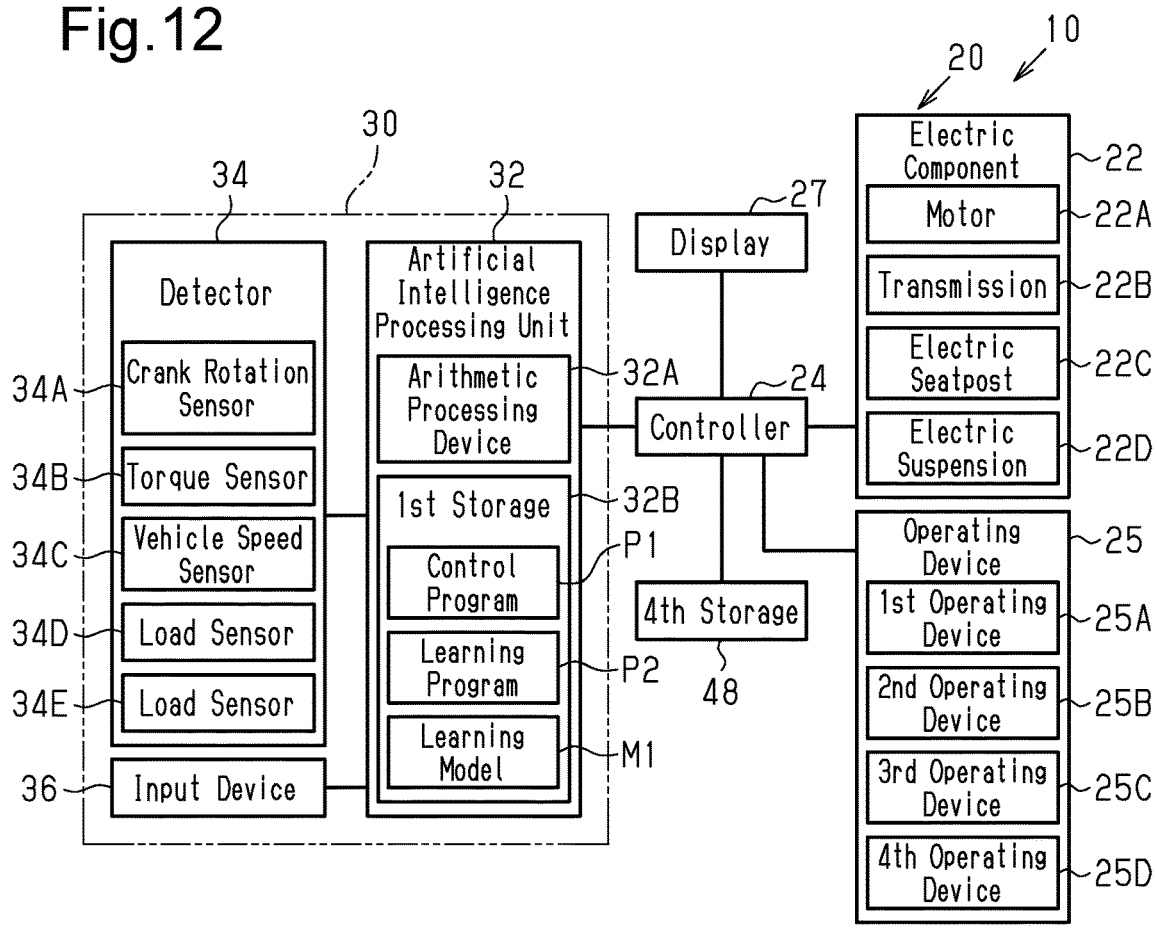
FIG. 12 is a block diagram showing the electrical configuration of a control system of a human-powered vehicle in a fourth embodiment.
Figure 13:
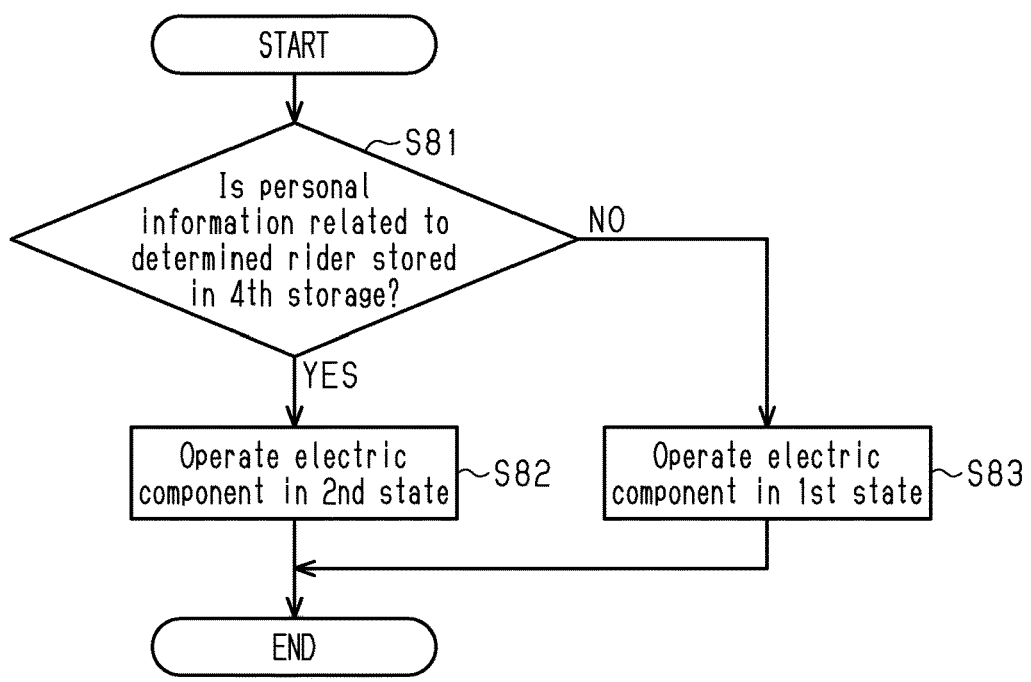
FIG. 13 is a flowchart of a process for switching a control state of the electric component executed by the controller shown in FIG. 12.

A fourth embodiment of a control system 20 will now be described with reference to FIGS. 12 and 13. The control system 20 of the fourth embodiment differs from the control system 20 of the first embodiment in that the electric component 22 is controlled in accordance with personal information stored in fourth storage 48 but otherwise has the same configuration as the control system 20 of the first embodiment. The same reference characters are given to those elements that are the same as the corresponding elements of the first embodiment. Such elements will not be described in detail.

The control system 20 further includes the fourth storage 48 configured to store personal information related to a rider. The fourth storage 48 includes, for example, a nonvolatile memory. The fourth storage 48 can be independent from the first storage 32B or can be formed integrally with the first storage 32B. The electric component 22 is configured to operate in a first state in which at least one function is restricted and a second state in which at least one function is not restricted. In a case in which personal information related to the rider recognized by the artificial intelligence processing unit 32 is not stored in the fourth storage 48, the controller 24 operates the electric component 22 in the first state. Preferably, in a case in which personal information related to the rider recognized by the artificial intelligence processing unit 32 is stored in the fourth storage 48, the controller 24 operates the electric component 22 in the second state.

A process for switching the state of the electric component 22 will now be described with reference to FIG. 13. In a case in which the controller 24 is supplied with power, the controller 24 starts the process and proceeds to step S81 in the flowchart shown in FIG. 13. Additionally, in a case in which the learning mode is switched to the control mode, the artificial intelligence processing unit 32 can start the process and proceed to step S81 in the flowchart shown in FIG. 13.

In step S81, the controller 24 determines whether or not the personal information related to the recognized rider is stored in the fourth storage 48. In a case in which the personal information related to the recognized rider is stored in the fourth storage 48, the controller 24 proceeds to step S82. In step S82, the controller 24 operates the electric component 22 in the second state and ends the process.

In step S81, in a case in which the personal information related to the recognized rider is not stored in the fourth storage 48, the controller 24 proceeds to step S83. In step S83, the controller 24 operates the electric component 22 in the first state and ends the process.

MODIFIED EXAMPLES

The description related to the above embodiments exemplifies, without any intention to limit, applicable forms of a rider recognition device for a human-powered vehicle and a control system of a human-powered vehicle according to the present disclosure. The rider recognition device for a human-powered vehicle and the control system of a human-powered vehicle according to the present disclosure can be applied to modified examples of the embodiments that are described above and combinations of at least two of the modified examples that do not contradict each other. In the following modified examples, the same reference characters are given to those elements that are the same as the corresponding elements of the above embodiment. Such elements will not be described in detail.

Figure 14:
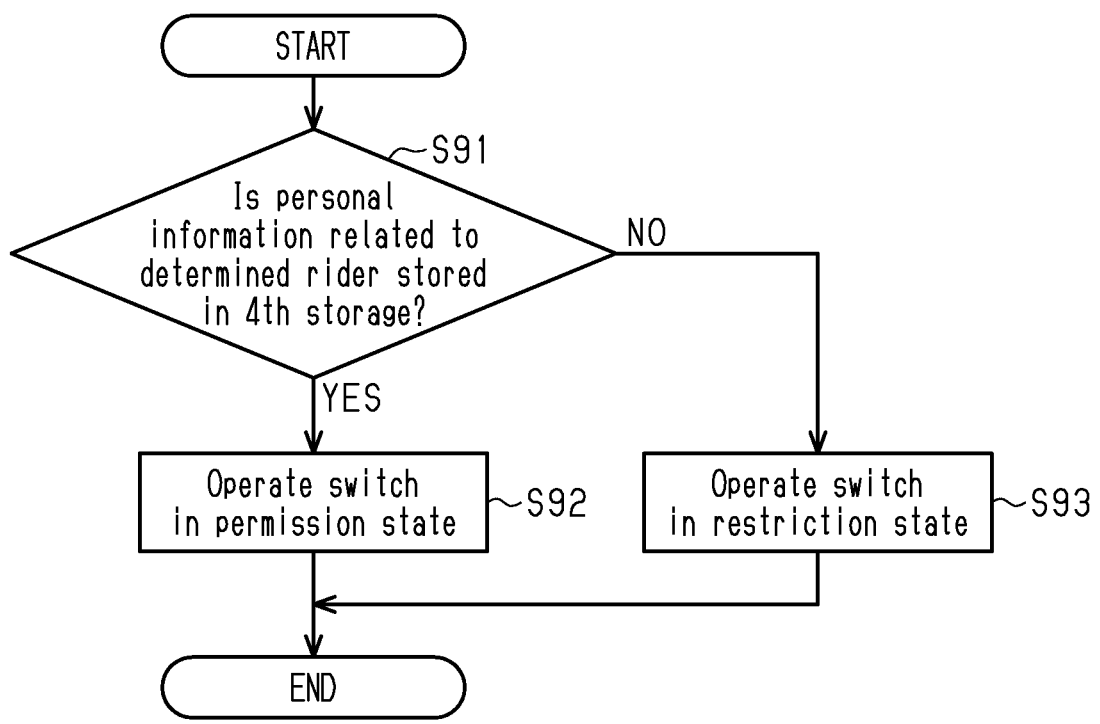
FIG. 14 is a flowchart of a process for switching a control state of the electric component executed by a first modified example of a controller.

The control system 20 of the third embodiment can further include the fourth storage 48 of the fourth embodiment, and the electric component 22 can include the switch 46 switching between the restriction state, which restricts traveling of the human-powered vehicle 10, and the permission state, which permits traveling of the human-powered vehicle 10. In a case in which personal information related to the rider recognized by the artificial intelligence processing unit 32 is not stored in the fourth storage 48, the controller 24 can operate the switch 46 in the restriction state. In this case, the controller 24 is configured to execute a process for switching the state of the electric component 22 shown in FIG. 14. In a case in which the controller 24 is supplied with power, the controller 24 starts the process and proceeds to step S91 in the flowchart shown in FIG. 14. Additionally, in a case in which the learning mode is switched to the control mode, the artificial intelligence processing unit 32 can start the process and proceed to step S91 in the flowchart shown in FIG. 14.

In step S91, the controller 24 determines whether or not the personal information related to the recognized rider is stored in the fourth storage 48. In a case in which the personal information related to the recognized rider is stored in the fourth storage 48, the controller 24 proceeds to step S92. In step S92, the controller 24 operates the switch 46 in the permission state and ends the process.

In step S91, in a case in which the personal information related to the recognized rider is not stored in the fourth storage 48, the controller 24 proceeds to step S93. In step S93, the controller 24 operates the switch 46 in the restriction state and ends the process.

The artificial intelligence processing unit 32 can be configured to operate without a distinction between the learning mode and the control mode. In this case, the artificial intelligence processing unit 32 starts to learn, for example, in a case in which riding starts or predetermined information is input to the input device 36. The artificial intelligence processing unit 32 continues to learn until the human-powered vehicle 10 stops traveling. In this case, the artificial intelligence processing unit 32 can execute the process for recognizing the rider and the process using the rider recognition result during the learning.

DESCRIPTION OF REFERENCE CHARACTERS 10) human-powered vehicle, 13) crank, 20) control system of human-powered vehicle, 22) electric component, 22A) motor, 22B) transmission, 22C) electric seatpost, 22D) electric suspension, 24) controller, 30) rider recognition device for human-powered vehicle, 32) artificial intelligence processing unit, 34) detector, 36) input device, 32B) first storage, 40) third storage, 44) second storage, 46) switch, 48) fourth storage

The invention claimed is:

1. A rider recognition device for a human-powered vehicle, the rider recognition device comprising:
    a detector configured to detect state information while the human-powered vehicle is traveling, wherein the state information is related to at least one of a state of the human-powered vehicle and a state of a rider of the human-powered vehicle; and
    an artificial intelligence processing unit including a learning model configured to recognize the rider corresponding to the state information detected by the detector, wherein
    the state of the human-powered vehicle includes at least one of a rotational speed of a crank of the human-powered vehicle and a vehicle speed of the human-powered vehicle such that the artificial intelligence processing unit is configured to recognize the rider based on the at least one of the rotational speed of the crank of the human-powered vehicle and the vehicle speed of the human-powered vehicle.

2. The rider recognition device according to claim 1, further comprising an input device configured to input personal information related to the rider, wherein the artificial intelligence processing unit is configured to build a process for recognizing the rider in a plurality of recognized riders of the human-powered vehicle in accordance with the personal information input from the input device and the state information detected by the detector.

3. The rider recognition device according to claim 1, wherein the artificial intelligence processing unit is configured to learn characteristics of changes in the state information detected by the detector.

4. The rider recognition device according to claim 3, wherein the artificial intelligence processing unit further includes first storage configured to store learned information.

5. The rider recognition device according to claim 2, wherein the artificial intelligence processing unit is configured to learn characteristics of changes in the state information detected by the detector in association with the personal information.

6. The rider recognition device according to claim 5, wherein the artificial intelligence processing unit further includes second storage configured to store learned information.

7. The rider recognition device according to claim 1, wherein in a case in which the rider cannot be recognized in a plurality of recognized riders of the human-powered vehicle, the artificial intelligence processing unit is configured to determine that a new rider is riding the human-powered vehicle.

8. The rider recognition device according to claim 1, wherein the state of the rider includes at least one of posture of the rider and weight of the rider.

9. A control system of a human-powered vehicle, the control system comprising:
    the rider recognition device according to claim 1;
    an electric component provided on the human-powered vehicle; and
    a controller configured to control the electric component in accordance with the rider recognized by the artificial intelligence processing unit.

10. The control system according to claim 9, further comprising third storage configured to store setting information corresponding to the rider,
wherein the controller is configured to control the electric component in accordance with the setting information corresponding to the rider recognized by the artificial intelligence processing unit.

11. The control system according to claim 10, wherein the electric component includes at least one of a motor configured to assist propulsion of the human-powered vehicle, a transmission, an electric seatpost, and an electric suspension.

12. The control system according to claim 10, wherein
the electric component is configured to operate in a first state in which at least one function is restricted and a second state in which the at least one function is not restricted, and
the controller is configured to operate the electric component in the first state in a case in which the artificial intelligence processing unit cannot recognize the rider.

13. The control system according to claim 10, wherein
the electric component includes a switch configured to switch the electric component between a restriction state in which the electric component restricts traveling of the human-powered vehicle and a permission state in which the electric component permits traveling of the human-powered vehicle, and
the controller is configured to operate the switch in the restriction state in a case in which the artificial intelligence processing unit cannot recognize the rider.

14. The control system according to claim 10, further comprising:
fourth storage configured to store personal information related to the rider, wherein
the electric component is configured to operate in a first state in which at least one function is restricted and a second state in which the at least one function is not restricted, and
the controller is configured to operate the electric component in the first state in a case in which the personal information related to the rider recognized by the artificial intelligence processing unit is not stored in the fourth storage.

15. The control system according to claim 10, further comprising:
fourth storage configured to store personal information related to the rider, wherein
the electric component includes a switch configured to switch the electric component between a restriction state in which the electric component restricts traveling of the human-powered vehicle and a permission state in which the electric component permits traveling of the human-powered vehicle, and
the controller is configured to operate the switch in the restriction state in a case in which the personal information related to the rider recognized by the artificial intelligence processing unit is not stored in the fourth storage.

\* \* \* \* \*